UNITED STATES PATENT OFFICE.

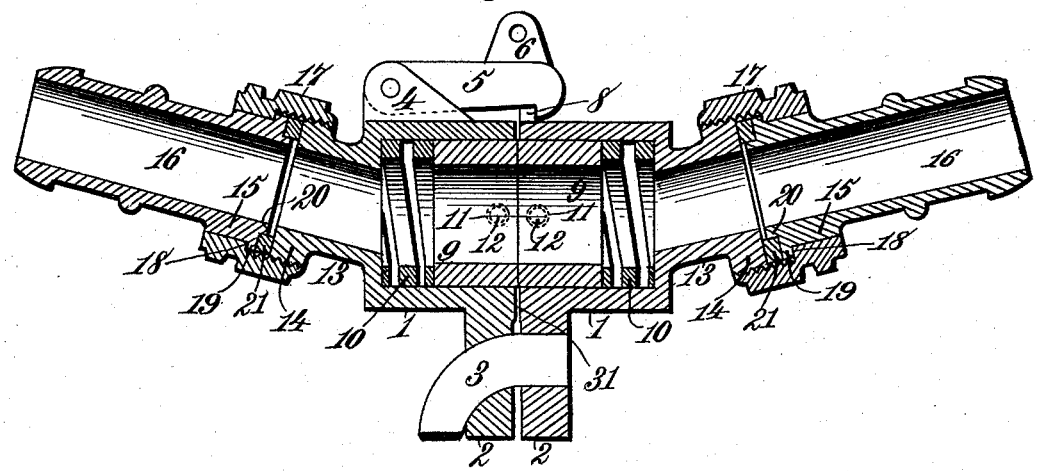
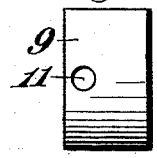 
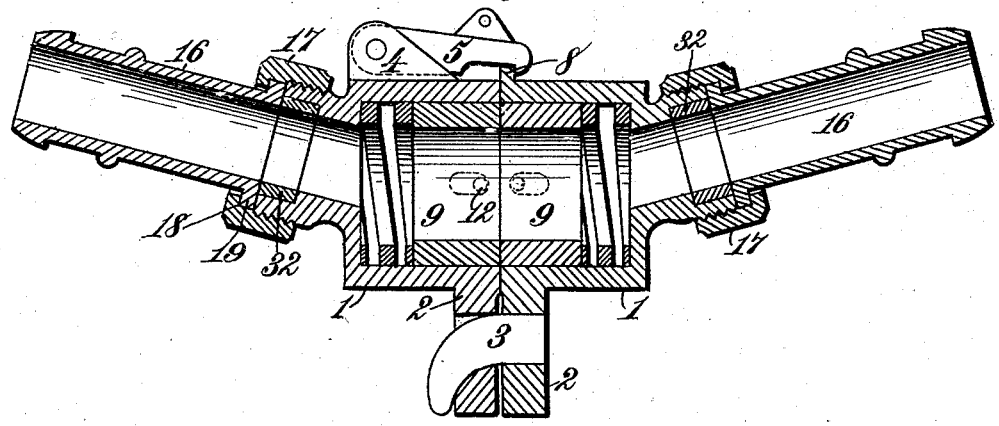

JOHN Q. C. SEARLE AND EDWARD W. JENKS, OF CHICAGO, ILLINOIS.

COMBINED HOSE-COUPLING AND STEAM-TRAP.

SPECIFICATION forming part of Letters Patent No. 505,727, dated September 26, 1893.

Application filed September 6, 1892. Serial No. 445,184. (No model.)

*To all whom it may concern:*

Be it known that we, JOHN Q. C. SEARLE and EDWARD W. JENKS, citizens of the United States, residing at Chicago, in the county of Cook and State of Illinois, have invented new and useful Improvements in a Combined Hose-Coupler and Steam-Trap, of which the following is a specification.

This invention relates to automatically detachable couplings for steam hose and steam pipes, and has for its object to provide a coupler comprising radially expansible rings which will temporarily permit the condensed steam to be discharged, and, when heated by live steam passing through them will expand in a radial direction and cause the coupler to become steam tight, thereby providing a coupling that at first temporarily acts as a steam trap and which afterward, by becoming steam tight, prevents any waste of live steam.

To accomplish this object our invention consists in the features of construction and the combination or arrangement of devices hereinafter described and claimed, reference being made to the accompanying drawings, in which—

Figure 1 is a vertical longitudinal section of our automatically detachable steam tight coupling having two similar composition rings of expansible material and two springs inclosed within the two parts of the coupling, showing, also, longitudinal sections of two hose nipples detachably connected with the coupling. Fig. 2 is a view of one of the expansible rings placed in each part of the coupling and having in its exterior a recess or depression to receive the end of a screw by which it is held in place when the two parts of the coupling are disconnected. Fig. 3 is a view of one of the springs. Fig. 4 is a longitudinal sectional view, showing a modification; and Fig. 5 is a detail view hereinafter explained.

Referring to the drawings, the numeral 1 designates one half of the coupling each of which is a counterpart of the other. On the bottom of each half of the coupling is a depending arm 2 having a hooked lug 3 adapted to be engaged with and disengaged from an opening in the corresponding arm of the other half of the coupling thereby forming a detachable hinged connection. To lugs 4 on the top of each coupling part 1 is hinged or pivoted a locking clutch 5 having a lug or projection 6 for attachment of one end of a chain or flexible connection for a purpose hereinafter explained. Each locking clutch 5 is adapted to firmly engage a locking lug or projection 8 on the upper part of the other half of the coupling when the two halves are properly brought together after the hooked lugs 3 have each been engaged with the depending arm 2 of the other half of the coupling.

Within the forward portion of each coupling half 1 is placed a radially expansible ring 9, composed of any suitable or well known composition or material that will readily expand under the action of heat. At the rear of each radially expansible ring 9 is placed a spiral spring 10, which tends to force the expansible ring 9 forward so that each ring will project slightly beyond the face of its respective half of the coupling.

For the purpose of preventing the expansible rings 9 and the springs 10 from dropping out when the halves of the coupling are disconnected from each other a recess or depression 11, is formed in the exterior of each ring 9 to receive one end of a screw 12 that is inserted through one side of the coupling. By reference to Figs. 1 and 2 it will be seen that the recess 11 is preferably somewhat enlarged to permit a slight longitudinal movement of the ring 9 under pressure of the spring 10 while the engagement of the screw 12 in said recess will prevent the ring from being forced or dropped out of the coupling.

On the rear portion of each coupling half 1 is formed a "union" 13 that may be provided with external screw threads 14. The means for detachably connecting the unions 13 and 15 consists of a nut 17 which is internally screw threaded at one end to engage the external screw threads 14 on the union 13 while the other end of the nut is provided with an internal shoulder 18, to engage an external annular shoulder or collar 19, on the union 15. It is obvious that the relative positions of the screw threads 14 and collar 19 on the coupling and hose nipple respectively, may be reversed, if desired, without affecting the operation of the device.

On an annular flange or shoulder 20 at the end of one of the unions 13 or 15 may be seated a gasket or packing ring 21, which is covered by the nut 17 when the hose nipple and coupling are connected. This gasket or packing ring 21 is, however, not essential and in lieu thereof a close ground joint may be provided between the union ends of the hose nipple and the coupling.

When the usual hose is properly attached, to the train pipe of a steam heating system for railway cars and the couplings 1 are connected by the detachable hinged joint 3 and hinged locking clutches 5 the said couplings will at first act as a steam trap to effect the removal of any water of condensation in the train pipe and will then become steam tight so as to prevent loss of live steam. The expansible rings 9 are made to fit quite closely in the coupling and are yet loose enough to permit the water of condensation first formed in the train pipe to pass beneath them between the opposite rings and lower parts of the coupling and discharge through the joint 31, Fig. 1, between the two halves of the coupling until only live steam fills the train pipe and couplings. The rings 9 will then become expanded radially by the heat of the live steam so that no steam or water can escape at the coupling. It will thus be seen that this coupling is adapted to serve temporarily as a steam trap for the discharge of condensed steam and afterward as a permanent and reliable steam tight coupler.

In uncoupling the cars of a train the hose couplings 1 will be automatically disconnected by the usual chains or flexible connections drawing on the hinged locking clutches 5 thereby disengaging said clutches from the locking lugs 8 and permitting the coupling halves to swing apart on their hooked lugs 3, the said hooks each becoming wholly disengaged from the opposite arms 2 as soon as the cars have been moved sufficiently far apart. In order to again connect the hose couplings it is only necessary to engage each hooked lug 3 with the opposite perforated arm 2 and then bring the upper parts of the couplings together and force the hinged locking clutches 5 down into engagement with the locking lugs 8 of the respective halves of the coupling. By loosening or unscrewing the nuts 17 the coupling may be quickly and easily detached from the hose and a different style of coupling be connected thereto without disconnecting the entire hose and coupling from the train pipe. Connection with "foreign" cars provided with a different style of coupling can thus be readily effected whenever required.

As shown in Fig. 4 the annular flange or shoulder 20 and the gasket 21, hereinbefore described may be dispensed with and in lieu thereof the outer end of the union 13 may be recessed to receive a packing ring 32, against which the end of the hose nipple 16 may abut and be secured by the nut 17.

What we claim as our invention is—

The combination with the halves of an automatically detachable steam tight hose coupling, of two radially expansible rings each inclosed in a half of the coupling and adapted to project therefrom in contact with the corresponding ring in the other half of the coupling, each ring provided with a recess in its exterior, screws inserted through the side of each coupling-half and engaged in said recesses of the expansible rings, and two springs each located in the rear of a coupling-half in bearing contact with one of said expansible rings, whereby the coupling is adapted to serve temporarily as a steam trap for discharge of condensed steam and afterward become steam tight by radial expansion of said rings to prevent waste of live steam.

In testimony whereof we have hereunto set our hands in presence of the subscribing witnesses.

JOHN Q. C. SEARLE.
EDWARD W. JENKS.

Witnesses to the signature of J. Q. C. Searle:
  J. A. RUTHERFORD,
  HOWARD M. NORRIS.
Witnesses to signature of E. W. Jenks:
  W. H. McCARTEN,
  F. D. HUTCHINS.